United States Patent Office 2,994,687
Patented Aug. 1, 1961

2,994,687
PROCESS OF POLYMERIZING FORMALDEHYDE IN THE PRESENCE OF ONIUM COMPOUNDS AS INITIATORS
Henry Harris Goodman, Jr., Wilmington, Del., and Laurence Thomas Sherwood, Jr., West Chester, Pa., assignors to E. I. du Pont de Nemours and Company, Wilmington, Del., a corporation of Delaware
No Drawing. Filed Jan. 6, 1959, Ser. No. 785,135
7 Claims. (Cl. 260—67)

This invention relates to a novel group of formaldehyde polymerization initiators, and more particularly, it relates to a process of preparing high molecular weight polyoxymethylene employing certain onium salts as polymerization initiators.

This application is a continuation-in-part of our co-pending application Serial No. 521,878, filed July 13, 1955.

Other compounds are known to be capable of initiating the addition polymerization of formaldehyde, but it has become apparent that each group of initiator compounds has its own peculiar characteristics. Some of the known initiators are particularly sensitive to impurities, in the polymerization system, while others effect such a low polymerization rate that they are not commercially attractive, and still others must be present in the polymerization system in high concentrations to effect a reasonable amount of polymerization. The compounds described herein as being initiators for the polymerization of formaldehyde have been found to be less sensitive than other initiators to impurities in the polymerization medium, to be capable of producing polymer at a high rate even though very small quantities of initiator are employed.

It is an object of this invention to provide a novel group of initiators for the addition polymerization of formaldehyde. It is another object of this invention to provide a process for preparing high molecular weight polyoxymethylene by utilizing, as a polymerization initiator, an onium salt in which the central atom is nitrogen, phosphorus, or sulfur. Other objects will be apparent from the detailed description of the invention given herein.

The above objects are accomplished by polymerizing substantially anhydrous monomeric formaldehyde in the presence of an onium salt consisting of an anionic portion and a cationic portion, the anionic portion being an anion which will form covalent bonds with formaldehyde, desirably the ion formed by removal of the acid hydrogen atom from an acid selected from the group consisting of hydrogen fluoride, hydrogen chloride, hydrogen bromide, hydrogen iodide, and all other acids having a dissociation constant measured at 25° C. in an aqueous medium of $1 \times 10^{-16}$ to $1 \times 10^{-2}$, the cationic portion consisting of a central atom selected from the group consisting of nitrogen, phosphorus, and sulfur, the central atom being bonded to a sufficient number of substituent organic groups to satisfy the valence of the central atom. The onium compounds employed in this invention may be illustrated by the following structural formulae:

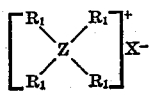

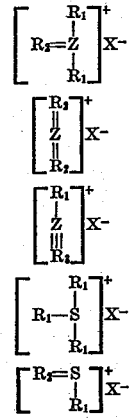

and

[R₄≡S]⁺X⁻ wherein Z is an element selected from the group consisting of nitrogen and phosphorus, S is sulfur, X is an anion of an acid, $R_1$ is a monovalent organic radical, $R_2$ is a divalent organic radical, and $R_3$ is a trivalent organic radical. The radicals, $R_1$, $R_2$, and $R_3$, preferably are hydrocarbon groups because of the relative ease of making onium compounds with such radicals, but they may be substituted, unsaturated, contain acyl or aroyl groups, or be otherwise modified without affecting the catalytic nature of the onium compound. The onium compounds which are preferred for this process are the quaternary ammonium carboxylates having at least 2 long-chain hydrocarbon groups of at least 12 carbon atoms each attached to the central nitrogen or phosphorus atom.

Another type of onium compound which is employed as the initiator in the process of this invention is betaine. These compounds have the following structures:

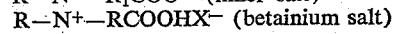

wherein R is a hydrocarbon radical or series of hydrocarbon radicals satisfying three of the covalent bonds of nitrogen, $R_1$ is a hydrocarbon radical and X is a halide ion.

The following examples serve to illustrate various initiators which may be employed successfully to produce polyoxymethylenes of any molecular weight, although those of high molecular weight are particularly preferred. It is not intended, however, that this invention be limited only to the compounds specified in the examples since many other similar compounds are known to be operable.

In the examples, inherent viscosity is measured at 150° C. on solutions of 0.5 gram of polymer in 100 ml. of dimethylformamide containing 1 gram of diphenylamine. High molecular weight polyoxymethylenes have an inherent viscosity, measured in this manner, of at least about 0.4.

The reaction rate constant for thermal degradation at 222° C. ($k_{222}$) is determined by heating a known weight of polymer in a vapor bath at 222° C. and measuring the volume of gas evolving from the degrading polymer over a given time interval. The reaction rate constant for thermal degradation at 222° C. is reported as $k_{222}$ and has units of weight percent of the polymer which degrades per minute, and is calculated by the following equation:

$$k_{222} \text{ (percent/min.)} = \frac{\text{(volume of gas in cc. evolved in time } t) \times 0.0736}{\text{(time } t \text{ in minutes)} \times \text{(initial weight of polymer sample in g.)}}$$

The factor 0.0736 is a constant which is calculated on the assumption that all of the evolved gas is formaldehyde and that it behaves as an ideal gas.

A preferred method of determining the volume of gas evolved, which may in turn be used in the above equation, is to place a small weighed sample of polymer which is to be tested in a hypodermic syringe of about 50 cc. volume. The syringe containing the polymer is then placed in a vapor bath at a temperature of 222° C., which may be obtained by utilizing vapors of methyl salicylate which boils at 222° C. to 223° C., and recording the volume of vapor which is evolved in the period between 10 and 20 minutes residence time in the vapor bath. In the preferred operation of this test, polymer in the form of a small pressed pellet is weighed to the nearest 0.001 gram, placed in a well-cleaned syringe which is sealed between the plunger and the cylinder with a high quality lubricating fluid such as a polysilicone. The syringe is evacuated and filled with nitrogen several times, the nozzle of the syringe is sealed, the syringe is suspended in a bath of methyl salicylate vapors, and the volume of decomposition vapors evolved is recorded by noting the position of the syringe plunger both at 10 minutes and 20 minutes after placing the syringe in the vapor bath. If the gas evolution is plotted against time throughout the period of heating, it may be observed that the shape of the curve does not conform strictly to that which is predicted by first-order kinetics. The reason for this behavior is not fully understood, but it has been found experimentally that this test gives reasonably reproducible results which are very useful in comparing the thermal stabilities of high molecular weight polymers of formaldehyde.

In some instances the polymers in the examples are esterified. The procedure which may be used to esterify these polymers of formaldehyde may be that which is described and claimed in either of copending applications S.N. 681,188, filed by Dal Nogare and Punderson on August 30, 1957, or S.N. 763,842, filed by Jenkins and Punderson on September 29, 1958. These procedures in general entail heating the polymer in the presence of a carboxylic acid anhydride and a catalyst which may be an alkaline compound such as pyridine or a salt of a weak acid and a strong base such as sodium acetate. The esterified product normally contains 1 to 2 ester groups, located at the terminal positions of the polymer molecule, and by reason of these groups is considerably more thermally stable than the unesterified polymer.

Melt flow is determined by extruding the polymer through a standard orifice at standard conditions and calculating the flow rate from the observed values. The orifice is 0.0825 inch in diameter by 0.158 inch long. In normal operation 5.0 grams of the polymer is placed in the cylinder ahead of the orifice, and the polymer is heated to 200° C. and loaded with a piston weighing 60 grams plus an additional dead weight of 5000 grams. From the observed amount of extrudate accumulating over one minute intervals, the melt flow is calculated in grams per 10 minutes of elapsed time.

Film brittleness temperature is the temperature at which 50% of small strips of a film having specific dimensions crack rather than crease when folded sharply through an angle of 180°. The film has dimensions of $\frac{3}{32} \pm \frac{1}{32}$ wide by $0.012 \pm 0.001$ inch thick (at the point of the fold). The length of the film is not critical although in the following examples the length is ¾ inch. The fold is made between flat surfaces under ordinary manual pressure and the temperature may be attained by any suitable method, such as liquid hydrocarbons. There is a correlation between the Film Brittleness Temperature (FBT) and the number average molecular weight ($M_n$) such that an FBT of −76° C. is approximately equivalent to an $M_n$ of 35,000, and FBT of −92° C. is approximately equivalent to an $M_n$ of 45,000, and an FBT of −121° C. is approximately equivalent to an $M_n$ of 70,000.

EXAMPLE 1

Cyclohexyl hemiformal is pyrolyzed and the pyrolysis vapors are fractionally condensed to effect a separation of formaldehyde vapor from cyclohexanol and water condensate. The formaldehyde vapors are passed in series through two cold traps packed with glass helices and maintained at about 0° C. Formaldehyde vapors leaving the cold traps are introduced into a continuous 2-liter reactor containing toluol at 0° C. as the reaction medium. The polymerization initiator is an equimolar mixture of tetra-n-butylammonium iodide and lauric acid dissolved in toluol. All ingredients are pumped continuously into the reactor, and a polymeric dispersion product is continuously removed at such a rate that the contact time is about 10 min. The reaction medium is pumped into the reactor at such a rate that the average hold-up volume in the reactor is 600 ml. The formaldehyde vapors are passed into the reactor at a rate of about 8 grams per minute. The initiator solution is injected into the reaction medium at such a rate that the concentration of the quaternary ammonium iodide is 1.87 milligrams per liter of reaction medium and the concentration of lauric acid is 0.99 milligram per liter of reaction medium. The reaction medium is agitated and the reaction temperature is maintained at 65° C. The polymeric product is produced at a rate of 396 grams per liter of reaction medium per hour. After filtering, washing, and drying, the snow white polyoxymethylene product is found to exhibit an inherent viscosity of 0.67. After the polymer is esterified by treatment with acetic anhydride, it exhibits an inherent viscosity of 0.85.

EXAMPLE 2

The process of Example 1 is repeated except that n-heptane is employed in place of toluol as the reaction medium and tetra-n-butylammonium laurate is employed as the polymerization initiator in place of the mixture of tetra-n-butylammonium iodide and lauric acid. The concentration of tetra-n-butylammonium laurate is 0.5 mg./liter of reaction medium. The contact time is 5 minutes and the reaction temperature was 33° C. The yield of polyoxymethylene product is 363 grams per liter of reaction medium per hour, and the polymer has an inherent viscosity of 0.82. After the polymer was esterified by reaction with acetic anhydride, the product exhibited a melt flow of 9.4 g./10 min., and a reaction rate constant for thermal degradation at 222° C. of 0.06% by weight per minute.

EXAMPLES 3 to 11

In a series of experiments conducted in a similar manner to that described in Example 1 other quaternary ammonium initiators are tested to determine their efficiency in polymerizing formaldehyde. The conditions of each reaction and the properties of the polymer produced are shown in Table I. The reaction medium in Example 2 is n-heptane while the reaction medium in the other examples is cyclohexane.

Table I

| Example | Polymerization Initiator | Initiator Concentration, milligrams per liter of reaction medium | Contact Time, min. | Hold-up Volume, ml. | Polymerization Rate, grams polymer per liter of reaction medium per hour | Inherent Viscosity [3] | Film Brittleness Temperature,[4] ° C. | Melt Flow,[4] grams per 10 mins. |
|---|---|---|---|---|---|---|---|---|
| 3 | Trimethylstearyl-ammonium laurate. | 1.5 | 12 | 500 | 225 | 0.6 | | |
| 4 | Tetra-n-butyl-ammonium laurate. | 1.0 | 14 | 700 | 150 | 1.55 | −70 | 9.5 |
| 5 | Triethylbenzyl-ammonium laurate. | 1.1 | 14 | 700 | 65 | 1.6 | | |
| 6 | Benzyltrimethyl-ammonium nonylphenylate. | 1.1 | 12 | 500 | 150 | 1.65 | −85 | 6.0 |
| 7 | Dimethyldi(hydrogenated tallow)ammonium acetate.[1] | 1.0 | 14 | 700 | 250 | 1.48 | −85 | 7.5 |
| 8 | Dimethyldi(hydrogenated tallow)ammonium benzoate.[1] | 1.0 | 14 | 700 | 200 | 1.65 | −90 | 8.4 |
| 9 | Dimethyldi(coco)-ammonium acetate.[2] | 1.0 | 14 | 700 | 275 | 1.43 | −95 | 4.5 |
| 10 | Dimethyldi(coco)-ammonium benzoate.[2] | 1.0 | 14 | 700 | 250 | 1.40 | −80 | 4.6 |
| 11 | Dimethyldioctadecyl-ammonium acetate. | 1.0 | 14 | 700 | 275 | | −91 | 2.8 |

[1] Hydrogenated tallow is a mixture of 70% octadecyl and 30% hexadecyl.
[2] Coco is a derivative of coconut oil containing approximately 8% octyl, 9% decyl, 47% dodecyl, 18% tetradecyl, 8% hexadecyl, and 10% octadecyl groups.
[3] Inherent viscosity is measured on the polymer as received from the reactor.
[4] Film Brittleness Temperature and Melt Flow are measured on the polymer after it is esterified by reaction with acetic anhydride.

EXAMPLE 12

Formaldehyde vapor is generated by pyrolysis of cyclohexyl hemiformal as described in Example 1. The formaldehyde vapor is then passed in series through three U-tubes maintained at 0° C. and packed with stainless steel screen packing in order to purify the vapors which are then introduced into the polymerization reactor. A one-liter flask fitted with a stirring device and containing 500 ml. of n-heptane serves as the polymerization reactor and the reaction medium. The polymerization initiator is tetraethylphosphonium iodide dissolved in a 1:1 mixture of benzene and acetone. The purified formaldehyde described above is introduced into the vapor space of the reactor, the polymerization initiator solution is injected into the reaction medium, and the reaction medium is agitated at a temperature of 30°–35° C. Polymeric particles form continuously during the reaction, and after 30 minutes the reaction medium becomes a thick slurry. After filtering and washing the polymer particles with acetone and methanol in a high speed mixer, the particles are filtered and dried. The product is 21.5 grams of a snow-white polyoxymethylene exhibiting an inherent viscosity of 1.10.

EXAMPLE 13

In a manner similar to that described in Example 12, the quaternary polymerization initiator employed is triethyloctadecylphosphonium bromide. The polymer product recovered after 1 hour reaction time amounts to 28.7 grams and has an inherent viscosity of 1.24.

EXAMPLE 14

In a manner similar to that described in Example 12, the quaternary polymerization initiator employed is tri-n-butylethylammonium iodide. The polymer product after 50 minutes of reaction time amounts to 28.4 grams exhibiting an inherent viscosity of 0.69.

EXAMPLE 15

Formaldehyde, generated by the pyrolysis of alpha-polyoxymethylene at 160° C. and purified by passing through a series of cold traps maintained at −20° C., is passed into a reaction vessel containing 800 ml. of a commercial petroleum fraction boiling between 212° C. and 284° F. and consisting predominantly of octanes. The polymerization initiator is benzyltrimethylammonium nonylphenylate dissolved as a 40% solution in decahydronaphthalene. Three ml. of the initiator solution is added to the agitated reaction medium at room temperature, and formaldehyde is added over a 2-hour period. The slurry which forms is filtered, washed with a fresh sample of the octanes used in the reaction medium, and dried. There is recovered 26 grams of a snow-white high molecular weight polyoxymethylene.

EXAMPLE 16

Monomeric formaldehyde is generated continuously by pyrolysis of cyclohexyl hemiformal at 148° C. The gaseous formaldehyde in the pyrolysis vapors is purified by passage through two cold (0° C.) traps and is then passed into twin 1-liter glass polymerization vessels, each of which contains 400 ml. of dioxane, which had been pretreated with silica gel. Into one of these vessels there is added 5 milligrams of tributylsulfonium bromide. After 20 minutes the flask which contains the sulfonium bromide is removed from the monomer stream and 8.5 grams of white polyoxymethylene particles are recovered by filtration. Monomeric formaldehyde is introduced into the other vessel (control vessel) for a total of 40 minutes before the reaction medium is filtered with a yield of 0.02 gram of solid product. Five milligrams of tributylsulfonium bromide is added to the filtrate from the control vessel, causing rapid polymerization of the monomer dissolved in the dioxane. The amount of additional solid product recovered by filtration is 10.5 grams. All three polymer products are washed with cyclohexane and dried in a vacuum oven at 60° C. The total yield of polymer is 19 grams.

A wide variety of compounds are operable as the polymerization initiator in the processes of this invention. In general, the initiators are quaternary ammonium, quaternary phosphonium, or tertiary sulfonium compounds as hereinbefore described. The most common of these compounds are monofunctional; i.e., there is only one pentavalent nitrogen, pentavalent phosphorus, or tetravalent sulfur in the compound. There are, however, polyfunctional compounds having two or more of these groupings, and these polyfunctional compounds are intended to be included as initiators in the process of this invention. Such polyfunctional compounds might be represented by the formula

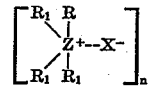

in which $R_1$, $Z$, and $X$ have the same meaning described hereinbefore and R is an organic group capable of polymerizing with other similar groups.

As indicated before, the onium salts contemplated as initiators in the process of this invention comprise two ionic portions, one being the anion and the other being the onium cation. The onium cation consists of a central element in its highest valence state, the element being nitrogen, phosphorus, or sulfur, to which are attached enough organic radicals to satisfy all of the element's valences and yet leave it with a positive charge so that it is a cation. The anion is the product formed by the removal of an acid hydrogen atom from any of certain acids. The anions which are operable in this process are those which form covalent bonds with formaldehyde. Generally, the anion of any acid will do so although some are very poor in this respect. A convenient description of most of the operable anions is those which are derived from the simple halogen acids; for example, hydrogen fluoride, hydrogen chloride, hydrogen bromide; and hydrogen iodide; and other acids having a dissociation constant from $1 \times 10^{-16}$ to $1 \times 10^{-2}$ at 25° C. as normally determined in an aqueous medium. Acids having a dissociation constant falling within this range may be found in any chemical handbook. Among these acids are acetic, arsenic, barbituric, benzoic, boric, bromacetic, brompropionic, butyric, carbonic, chloracetic, citric, formic, fumaric, hydrocyanic, hydroquinone, hydrosulfuric, hypochlorous, isobutyric, isovaleric, lactic, malic, naphthoic, phenol, phosphorous, phthalic, propionic, salicylic, stearic, succinic, tartaric, and valeric. The preferred acids include hydrobromic, hydriodic, and the unsubstituted aliphatic monocarboxylic acids having 1–18 carbon atoms per molecule.

The onium cation consists of a central nitrogen or phosphorus atom to which organic groups are attached by means of four covalent bonds, or a central sulfur atom to which organic groups are attached by means of three covalent bonds. It is immaterial whether these available covalent bonds are satisfied by several monovalent organic groups, or by some combination of monovalent, divalent and trivalent organic groups. Theoretically, a tetravalent organic group could be used to satisfy the valency of nitrogen and phosphorus, but no organic group of that character is readily available. The valency of the central atom may be satisfied in whole or in part by one or more ring structures. Still another alternative is a structure, such as a betaine, in which one of the organic groups attached to the central nitrogen atom also serves as the anion of the onium compound.

The organic group may be any type of organic radical; for example, alkyl, cycloalkyl, aryl, acyl, and aroyl, whether the radical is unsubstituted or substituted. The exact structure of these organic groups is not a critical feature of the invention in any sense. The nature of these groups contributes to the solubility of the onium compound in the polymerization medium, and for this reason it is usually preferable, when the polymerization medium is a hydrocarbon, e.g. heptane, cyclohexane, or toluene, that the onium compound contains 20–30 carbon atoms. For example, a desirable quaternary ammonium salt is one having at least two aliphatic hydrocarbon groups of at least 12 carbon atoms, each bonded to the central nitrogen atom. The other two groups might be methyl groups and the anion might be an acetate group. Such a compound would be much more soluble, and therefore more desirable as a polymerization initiator than a compound having a small number of carbon atoms such at tetramethylammonium iodide. It is to be emphasized again, however, that the nature of the organic groups attached to the central atom of nitrogen, phosphorus, or sulfur has no effect upon the activity of the onium compound as an initiator for the polymerization of formaldehyde other than its solubility in the polymerization medium. The nature of the organic groups on the cation portion does not alter the ionic character of that portion.

Specific quaternary ammonium compounds which have been established to be operable within the scope of this invention as illustrated by the above examples include, but are not limited to, tetramethylammonium bromide, diethyldioctadecyl ammonium chloride, tri-n-butyldodecyldiethyldioctadecyl ammonium iodide, butylhexyldodecyloctadecylammonium bromide, trimethylstearylammonium laurate, tetra-n-butylammonium laurate, triethylbenzylammonium laurate, benzyltrimethyammonium, nonylphenylate, dimethyldi(hydrogenated tallow)ammonium acetate, dimethyldi(hydrogenated tallow)ammonium benzoate, dimethyldi(hydrogenated tallow)ammonium formate, dimethyldi(coco)ammonium acetate, dimethyldi(coco)ammonium benzoate, dimethyldioctadecylammonium acetate, tetra-n-butylammonium iodide, N,N-diethylpiperidinium chloride, N-phenylethyltetramethyleneammonium iodide, dibutyloctadecamethyleneammonium acetate, bis(tri-n-butylammonium iodide)propane, betaine methyl ester of N-methyl-N-phenyl-glycine, 1-(carboxy methyl)pyridinium betaine, (carboxymethyl)tridecylammonium chloride, and others which will be apparent to those skilled in the art.

The quaternary phosphonium compounds which have been found to be operable as initiators for the processes of this invention as illustrated by the above examples include, but are not limited to, tetraethylphosphonium iodide, triethyloctadecylphosphonium bromide, tributylethylphosphonium iodide, phenylethylpentamethylenephosphonium acetate, bis(triethylphosphonium acetate) butane, and many others such as those listed in "Organophosphorus Compounds" by Kosolapoff (John Wiley and Sons, New York, 1950) at pages 86 to 94.

The tertiary sulfonium compounds which are operable as initiators in the processes of this invention as illustrated by the examples include but are not limited to tributylsulfonium bromide, trimethylsulfonium iodide, phenyldibutylsulfonium acetate, cyclohexyldiethoxysulfonium benzoate, and others which will be apparent to those skilled in the art.

The polymerization system of this invention is an anionic polymerization in which the anion of the onium salt initiates the polymerization of anhydrous formaldehyde by forming a covalent bond with a formaldehyde unit which, in turn, is made receptive to another formaldehyde unit, and so on until a high molecular weight polymer is produced. It is important, therefore, that a large supply of anions which form covalent bonds with formaldehyde be provided in this process. The cation of the onium compound is important in that it provides, or helps to provide, solubility to the onium compound from which the anions are supplied. The quaternary ammonium, quaternary phosphonium, and tertiary sulfonium compounds are desirable because they are soluble in the medium and they supply their anionic portions to the polymerization medium much more readily than, for example, an amine salt, an alkali metal salt, or the like. Thus it is important to this invention to provide as polymerization initiators anions which form covalent bonds with formaldehyde. The anion of any acid will do this to some extent, although a few, such as perchlorate, sulfate, and nitrate, are very poor in this respect. The ability of an anion to form covalent bonds with organic compounds is well-known to skilled chemists. For example, the knowledge that methyl chloride exists is proof of the fact that chlorine will form a covalent bond with carbon and, therefore, is a useful anion in the process of the present invention. For purposes of good solubility the onium compound preferably should have about 20–30 carbon atoms or more, and these may be in the form of hydrocarbon radicals forming part of the cationic portion of the onium compound, or they may be a part of the anionic portion. Tetrabutylammonium laurate is an example of a good initiator in which the anionic portion contributes greatly to the solubility of the compound in the organic polymerization medium. Dimethyldi(hydrogenated tallow)ammonium acetate is an example of an onium initiator in which substantially all of its solubility characteristics are derived from its cationic portion. Preferably, the anionic portion is the radical remaining after the removal of the acid hydrogen atom from an aliphatic monocarboxylic acid having 1–18 carbon atoms, and the cationic portion contains at least one hydrocarbon chain of at least 12 carbon atoms. Thus, dimethyldi(hydrogenated tallow)ammonium acetate is an example of a preferred initiator.

The amount of onium compound to be employed as the initiator in the polymerization of formaldehyde may vary according to the initiator used, the reaction medium employed, an other polymerization conditions. In general, however, the amount will be from about 0.1 to 100 milligrams of initiator per liter of reaction medium, the preferred amount being from about 1 to about 20 milligrams per liter of reaction medium.

Any process of polymerizing substantially anhydrous formaldehyde may be employed with the initiators described herein. The preferred process is one in which substantially pure anhydrous formaldehyde vapor, containing less than about 0.1% by weight of substances reactive with formaldehyde, or, in other words, containing at least 99.9% by weight of formaldehyde, is introduced continuously into a reactor containing an agitated liquid, organic, solvent for formaldehyde at about −100° C. to 100° C., and preferably about 0° to 100° C. The organic solvent is preferably a liquid hydrocarbon containing 3 to 10 carbon atoms, for example, heptane, cyclohexane, or toluene, although any solvent which does not react with formaldehyde and remains liquid at the reaction conditions is operable. The initiator, preferably a quaternary ammonium salt having at least 2 substituent hydrocarbon groups of at least 12 carbon atoms each attached to the nitrogen atom, is introduced into the reaction medium to form the desired concentration. The reaction temperature is maintained at a substantially constant value, and the reaction medium is kept saturated with formaldehyde. Polymeric particles are produced continuously during the continuous introduction of formaldehyde monomer and thus form a slurry from which the polymeric particles may be removed by filtration.

Polymers produced by the process of this invention are high molecular weight polyoxymethylenes which may be further treated so as to esterify or etherify the hydroxyl groups occupying one or both of the terminal positions of the polymer chain. Thereafter, the polymer is eminently suitable as a material to be fabricated into high quality films, fibers, filaments, and other shaped articles made by methods of casting, extrusion, molding, rolling, and the like.

We claim:

1. A process for the preparation of high molecular weight polyoxymethylene which comprises forming a reacting mixture by introducing substantially anhydrous monomeric formaldehyde into a liquid organic non-degrading solvent for formaldehyde, said solvent having dissolved therein 0.1 to 100 milligrams per liter of said solvent of an onium compound as an initiator, said onium compound consisting of an anionic portion and a cationic portion, the anionic portion being the ion formed by the removal of an acid hydrogen atom from an acid selected from the group consisting of hydrogen fluoride, hydrogen chloride, hydrogen bromide, hydrogen iodide, and every acid having a dissociation constant, measured at 25° C. in an aqueous medium, of $1 \times 10^{-16}$ to $1 \times 10^{-2}$, the cationic portion comprising a central atom selected from the group consisting of nitrogen, phosphorus, and sulfur and sufficient substituent organic radicals attached by covalent bonds to said central atom that the said cationic portion has a single positive charge, said organic radicals being selected from the group consisting of alkyl, cycloalkyl, aryl, acyl, and aroyl, maintaining said reacting mixture at a temperature of −100° C. to 100° C. while particles of polymer form therein, and recovering a dispersion of particles of high molecular weight polyoxymethylene in said solvent.

2. A process for the preparation of high molecular weight polyoxymethylene which comprises causing vapors comprising at least 99.9% by weight of formaldehyde to flow into a reaction vessel containing a liquid non-degrading solvent for formaldehyde and containing 0.1 to 100 milligrams per liter of said solvent of an onium salt as a polymerization initiator, said onium salt consisting of a cation comprising a central atom selected from the group consisting of nitrogen, phosphorus and sulfur, which is attached by covalent bonds to a sufficient number of substituent organic radicals selected from the group consisting of alkyl, cycloalkyl, aryl, acyl, and aroyl, such that the said cation has a single positive charge, and an anion which is the ion formed by the removal of an acid hydrogen atom from an acid selected from the group consisting of hydrogen fluoride, hydrogen chloride, hydrogen bromide, hydrogen iodide, and every acid having a dissociation constant, measured at 25° C. in an aqueous medium, of $1 \times 10^{-16}$ to $1 \times 10^{-2}$; maintaining the reacting mixture of formaldehyde, solvent and initiator at a temperature of about −100° C. to 100° C. while particles of a high molecular weight polyoxymethylene form in the said solvent, and recovering a dispersion of the said polyoxymethylene in the said solvent.

3. The process of claim 2 in which the said onium salt is a quaternary ammonium carboxylate having 20–30 carbon atoms per molecule of salt, the carboxylate portion of the said salt being the radical formed by the removal of the carboxylic hydrogen atom from an aliphatic monocarboxylic acid having 1–18 carbon atoms per molecule.

4. The process of claim 2 in which the said onium salt is a quaternary phosphonium halide.

5. The process of claim 2 in which the said onium salt is a tertiary sulfonium halide.

6. The process of polymerizing formaldehyde which comprises continuously passing vapors of substantially pure formaldehyde into a reaction medium comprising a liquid hydrocarbon containing 3–10 carbon atoms per molecule and 0.1 to 100 milligrams per liter of said reaction medium of a quaternary ammonium carboxylate consisting of a cation portion comprising a central atom of nitrogen having all four of its valences satisfied by covalent bonds between said nitrogen and 2–4 hydrocarbon radicals, at least 2 of which radicals contain at least 12 carbon atoms each, and an anion portion which is the radical formed by the removal of the carboxylic hydrogen atom from an aliphatic monocarboxylic acid having 1–18 carbon atoms per molecule; continuously agitating said reaction medium at a temperature of 0° C. to 100° C. while particles of polyoxymethylene form therein, and recovering a dispersion of high molecular weight polyoxymethylene particles in said reaction medium.

7. The process of claim 2 in which said onium salt is a betaine.

References Cited in the file of this patent

UNITED STATES PATENTS

| | | |
|---|---|---|
| 2,234,548 | Brannon | Mar. 11, 1941 |
| 2,734,889 | Starr | Apr. 16, 1954 |

OTHER REFERENCES

Walker: J.A.C.S., July 1933, p. 2821.